United States Patent
Løset et al.

(10) Patent No.: US 7,524,143 B2
(45) Date of Patent: Apr. 28, 2009

(54) LOADING SYSTEM FOR ICE INFESTED WATERS

(75) Inventors: Sveinung Løset, Trondheim (NO); Basile Bonnemaire, Trondheim (NO)

(73) Assignee: Statoil Asa, Stavanger (NO)

( * ) Notice: Subject to any disclaimer, the term of this patent is extended or adjusted under 35 U.S.C. 154(b) by 214 days.

(21) Appl. No.: 10/527,991

(22) PCT Filed: Aug. 21, 2003

(86) PCT No.: PCT/NO03/00289

§ 371 (c)(1),
(2), (4) Date: Mar. 21, 2005

(87) PCT Pub. No.: WO2004/028894

PCT Pub. Date: Apr. 8, 2004

(65) Prior Publication Data

US 2006/0165492 A1    Jul. 27, 2006

(30) Foreign Application Priority Data

Sep. 24, 2002    (NO)    ................................. 20024584

(51) Int. Cl.
*E02D 5/60* (2006.01)
(52) U.S. Cl. ........................ 405/213; 114/243; 405/215; 405/216; 405/217
(58) Field of Classification Search ................. 114/243; 405/211, 212, 213, 215, 216, 217
See application file for complete search history.

(56) References Cited

U.S. PATENT DOCUMENTS

| 3,367,355 A | | 2/1968 | Anderson | 137/209 |
| 3,664,388 A | | 5/1972 | Frankel | 141/284 |
| 4,505,618 A | | 3/1985 | Yashima | 405/211 |
| 4,844,213 A | * | 7/1989 | Travis | 188/377 |
| 5,108,227 A | * | 4/1992 | Bergey | 405/154.1 |
| 5,354,151 A | | 10/1994 | Giannesini | 405/205 |

FOREIGN PATENT DOCUMENTS

NO    308027    7/2000

* cited by examiner

*Primary Examiner*—Tara L. Mayo
(74) *Attorney, Agent, or Firm*—Foley & Lardner LLP

(57) ABSTRACT

A loading system for transfer of hydrocarbons between an installation on the sea bed (16) and a floating vessel (10) in areas exposed to drifting ice. The system including a submerged turret buoy (19), a flexible riser (18) extending from the sea bed installation (24) to the buoy (19) intended to be securely connected to a corresponding pipe on board the vessel (10), and a plurality of mooring lines (17) connected to the buoy (19) and extending outwards therefrom. The system further including a riser protection element (20) for protecting the riser (18) from impacts when the riser (18) is in an extended, load transferring mode, and a protective structure (24) located in or on the sea bed (16) for protection of the riser (18) when in a retracted position in a non-operative mode; that the protective structure (24) containing riser reel (28) for storing the riser (18) in a protected position when disconnected and retracted from the vessel (10). A method for mooring a vessel to a submerged turret buoy and a method for installing a riser protection element.

29 Claims, 7 Drawing Sheets

LOADING SYSTEM FOR ICE INFESTED WATERS

This application is a National Stage application of PCT/NO 03/000289, filed Aug. 21, 2003, which claims priority from Norwegian patent application NO 20024584, filed Sep. 24, 2002. The entire contents of each of the aforementioned applications are incorporated herein by reference.

The present invention relates to a submerged turret loading system (STL-system). More particularly, the present invention relates to a loading system for transfer of hydrocarbons from an installation on the sea bed to a floating vessel in areas exposed to drifting ice. Further, the invention relates to a method for mooring a vessel to a submerged turret buoy in ice infested waters, and to a method for installing a riser protection system in such waters. It is emphasized that the invention also can be used in areas where other types of dangers could harm a system for transfer of hydrocarbons, e.g. in the case of trawling or drifting timber.

BACKGROUND FOR THE INVENTION

Oil exploration has moved into arctic waters. Motion of drifting ice is often a crucial problem when designing and planning an off-take loading and mooring system in ice infested waters. It is imperative to design systems and methods which eliminate the risks for pollution, caused by damage to the equipment due to impacts from the drifting ice.

The drifting motion of ice is mainly governed by wind, waves, ocean currents and tidal forces. From analyses for the Eastern Barents Sea, it has been found that on a large time scale the ice drifting motion is clearly stochastic and with the exception of periods with rather straight lined movement, it resembles Brownian motion. Since ice floes are generally large and heavy, the direction and absolute value of their speed cannot change momentarily. Models predict steady motion of the ice, but occasionally the direction of the ice drift may change to the opposite direction in roughly half an hour. This is a major concern for the conventional loading concept where the tanker, say 90 000DWT, is staying in the "wake" behind a platform or a tower extending up above the sea level. If using a sub sea loading concept instead in waters subjected to drifting ice, allowing the tanker to 'ice-vane', advantages may be achieved.

In ice-infested waters, however, bottom installations might be damaged by deep ice formations (ice ridges in the Pechora Sea, icebergs in some other places).

Tests executed in 1997 and 2000 at the Hamburg Ship Model Basin (HSVA), Germany, testing the Submerged Turret Loading system, STL, in frozen seas, showed that under-keel installations will be in contact with ice as soon as the ice conditions worsen (interactions with ice ridges). Hence, the riser has to be protected from this hazard.

PRIOR ART

U.S. Pat. No. 5,820,429 describes an arrangement of a loading/unloading buoy for use in shallow waters wherein a buoy is arranged for introduction and releasable securement in a downwardly open receiving space in a floating vessel. The buoy comprises a bottom anchored centre member for the passage of fluid from or to a transfer line which is coupled to the underside of the center member. The buoy further comprises an outer member which is rotatably mounted on the center member to allow turning of the vessel about the center member when the outer member is secured in the receiving space. The buoy is provided with a bottom support structure which is connected to the center member of the buoy and arranged for support of the buoy at the sea bed when not in use. To the center member of the buoy there are connected a number of mooring lines extending outwards from the buoy a substantial distance along the sea bed. Such a system has an inherent elasticity allowing raising of the buoy from the sea.

SUMMARY OF THE INVENTION

The object of the invention is to further develop a loading system which may operate safely in ice infested waters where the submerged turret system, including the riser may be stored in a completely sheltered manner when the system is not in use.

A further object is to provide a protection system for the riser extending between the sea bed and the vessel.

A still further object of the present invention is to provide a method for mooring a vessel to a submerged turret buoy in ice infested waters.

A further object of the present invention is to achieve a system wherein the loading system may quickly be retracted to a completely protected position where the riser will not be exposed to impact by the drifting ice. Correspondingly, it is an object to achieve a loading system where the loading operation may be quickly aborted and the moored tanker may be quickly released from the mooring system.

According to the present invention the objects are achieved by means of a loading system and methods as further defined in the claims.

BRIEF DESCRIPTION OF THE DRAWINGS

The invention will be further described in detail below in connection with an exemplary embodiment with reference to the drawings, wherein.

DETAILED DESCRIPTION OF THE PREFERRED EMBODIMENT

Figure 1:
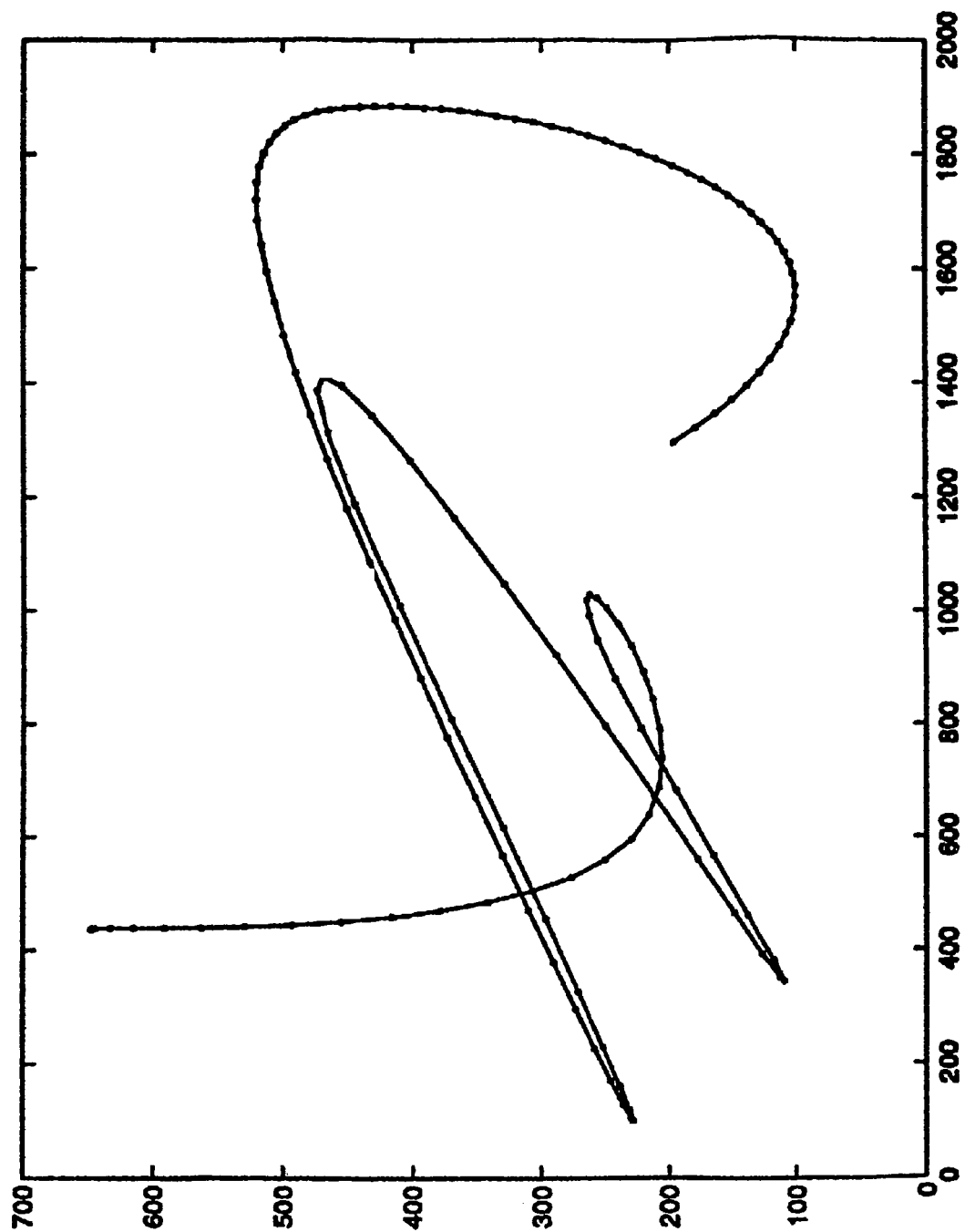
FIG. 1 shows modelled movement of the ice drift.

FIG. 1 shows modelled movements of the ice drift. The increment between each dot on the graph represents a time lapse of 10 minutes. The Figure gives an impression of the movement during a 24-hour period. As indicated in the graph, the model predicts steady motion of the ice. Occasionally, however, the ice drift may change to the opposite direction in roughly half an hour. This is a major concern for the conventional loading concept where the tanker, say 90 000DWT, is staying in the "wake" behind a platform or a tower extending up above the sea level, as shown in FIG. 2.

Figure 2:
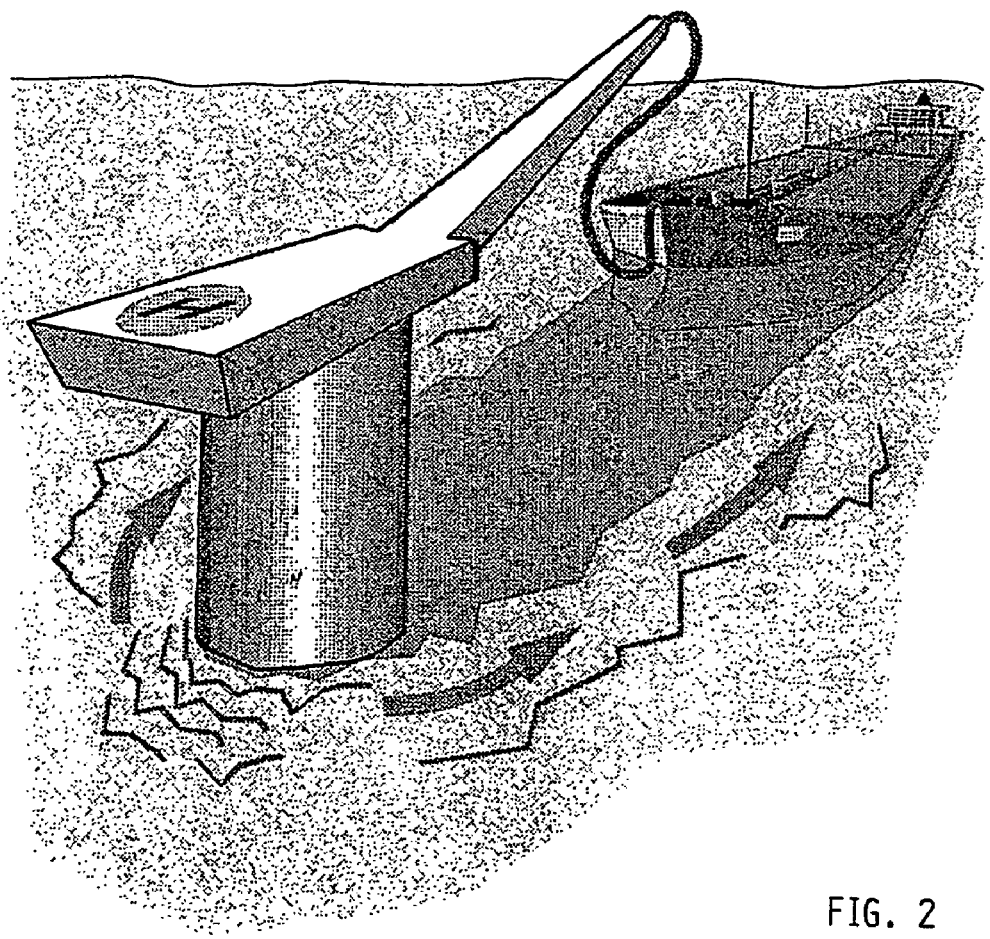
FIG. 2 shows a typical prior art loading system.

In FIG. 2 a tanker vessel 10 is moored to a platform 11 and fluids are transferred from the platform 11 to the vessel 10 through a flexible hose 12. The flexible hose 12 is suspended from a rotatably arranged loading arm 13. Since the vessel is only moored to the platform, the possibility of collision between the vessel 10 and the platform 11 is large if and when the drifting direction of the ice changes abruptly. In such case, the loading operation must stop immediately and the tanker 10 must quickly be released from its mooring system.

In order to overcome such problems, a sub sea loading concept is required, reducing possible interference with the drifting ice, and still allowing the tanker 10 to 'ice-vane' depending on the movement of the drift ice.

Figure 3:
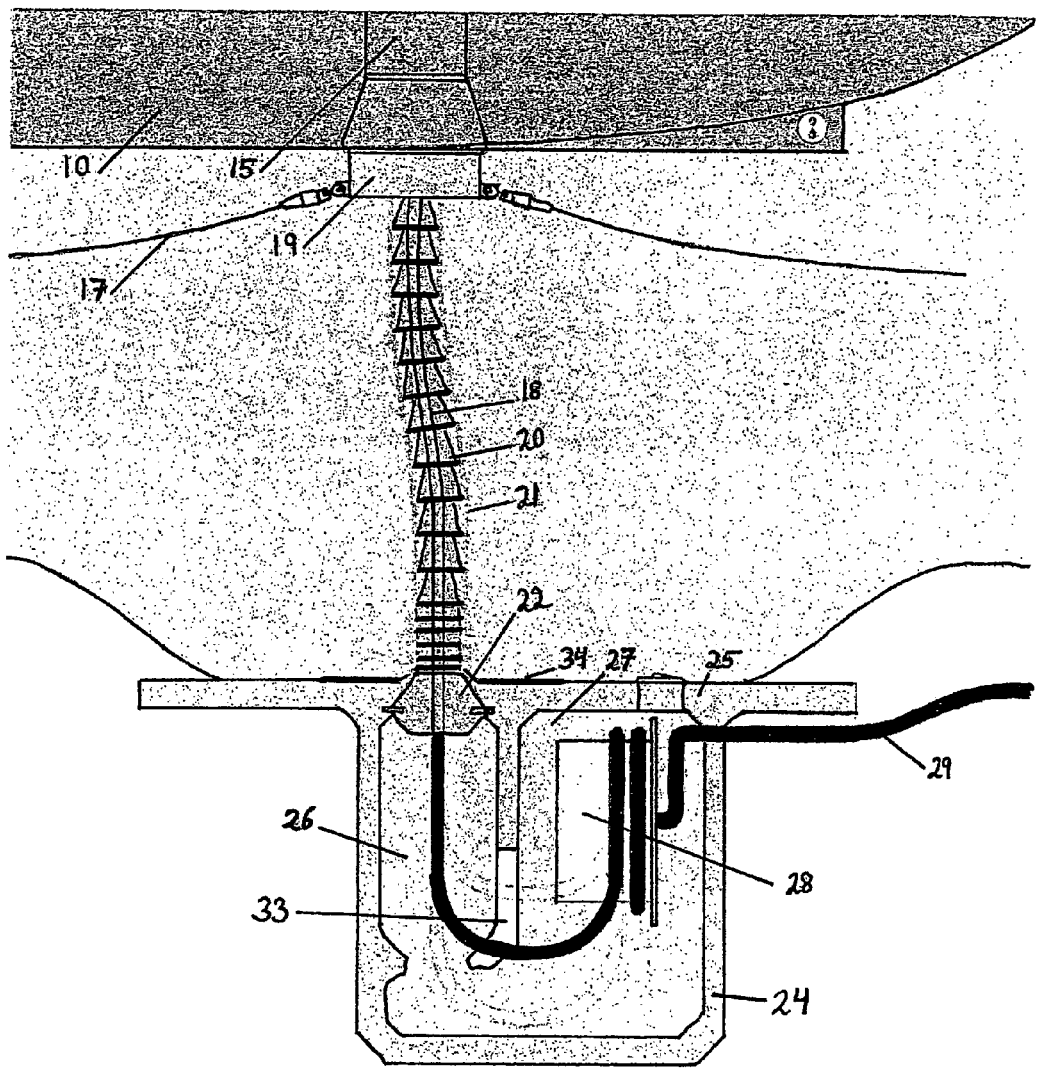
FIG. 3 shows the loading system according to the invention wherein the riser is connected to a vessel.

FIG. 3 shows in principle a preferred embodiment of a loading system according to the invention. As shown in FIG. 3, a vessel 10 is floating on the sea surface. The vessel 10 is equipped with a moon pool 15 and is rotatably moored to the sea bed 16 by means of a plurality of mooring lines 17. A flexible riser 18 extends between the sea bed 16 and the vessel 10. At its upper end the riser 18 is connected to a submerged turret buoy 19. The mooring lines 17 are coupled to the submerged turret buoy 19, allowing the vessel to weather vane. Such turret buoy may be of a type as is further detailed in the applicants U.S. Pat. No. 5,820,429, the content of which hereby is included by reference. The upper end of the riser 18 is releasable connected to a corresponding pipe line onboard the vessel by means of a swivel joint (not shown).

According to the invention, the riser 18 is protected by a riser protection means 20. According to the embodiment shown in FIG. 3 the upper end of the riser protection means 20 is suspended from the submerged turret buoy 19 by means of a plurality of chains, wires or the like 21. The lower end of the riser protection means 20 is coupled to a riser socket 22. According to a preferred embodiment of the invention the riser protection means 20 comprises a plurality of hollow, upwardly truncated conical elements 23, having a smaller upper diameter and a larger lower diameter or vice versa.

Figure 5:
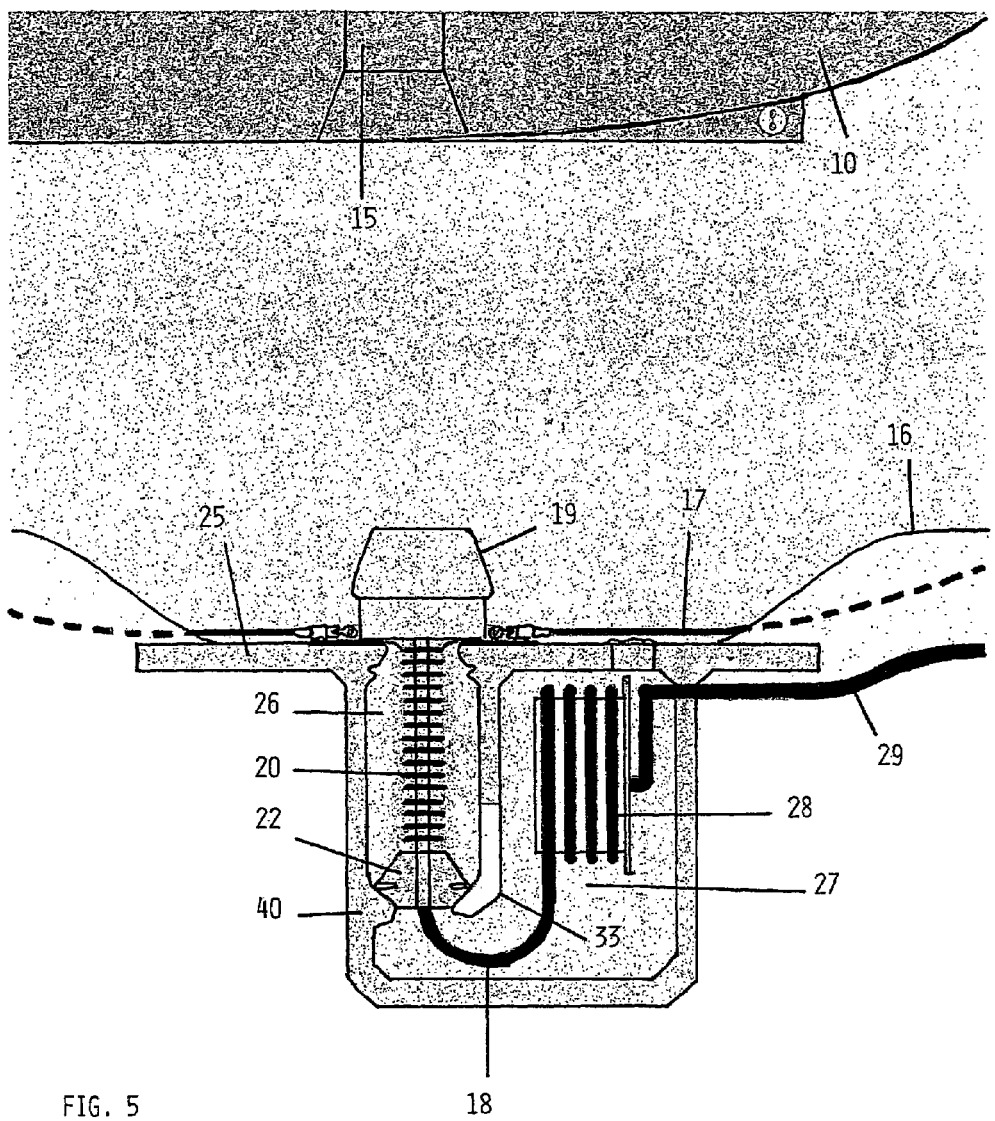
FIG. 5 shows the loading system in a retracted, idle position on the sea bed.

The loading system according to the invention comprises further a sea bed installation 24. According to a preferred embodiment of the invention the sea bed installation 24 is formed by a silo that will store and protect the riser 18 and the riser protection means 20 when the loading system not is in use. The silo 24 is dug into the sea bed 16, a top slab 25 of which being more or less flush with the sea bed 16. Hence, a very small part of the system is exposed on the sea bed when the loading system is retracted to its protected position, ref. FIG. 5.

The silo comprises two main parts; a cell 26 and a main chamber 27. A riser reel 28 is located in the chamber 27. The reel 28 rotates around a horizontal axis (not shown) and at least the lower end of the riser is reeled on to the reel 28. The reel 28 may for example be driven by motor or the like. The lower end of the riser 18 is coupled to a pipeline 29 from an oil well or the like. The coupling between the pipeline 29 and the lower end of the riser 18 is provided with a swivel of any conventional type, allowing relative rotation between the pipeline 29 and the riser reel 28.

The top slab 25 may according to an embodiment of the invention be provided with an opening 30 having a shape and a size adapted to the shape and size of the riser socket 22. The top slab 25, at least when used in shallow waters may be equipped with a manhole 31, allowing access for light maintenance.

A vertical slot 33 is provided in the lower part of a wall 32 dividing the cell 26 and the chamber 27. The height of the slot 33 exceeds the maximum expected heave amplitude of the vessel 10. The width of the slot 33 exceeds the diameter of the riser 18.

In order to minimize soil intrusion into the silo 24 when the loading system is connected to the vessel, flexible deflectors 34 are arranged over the opening 30 for the riser 18 and its protection means 20. Some yearly light maintenance can be performed to remove the soil deposited at the bottom of the silo. The system can also be modified to be soil intrusion proof, if needed.

Figure 4:
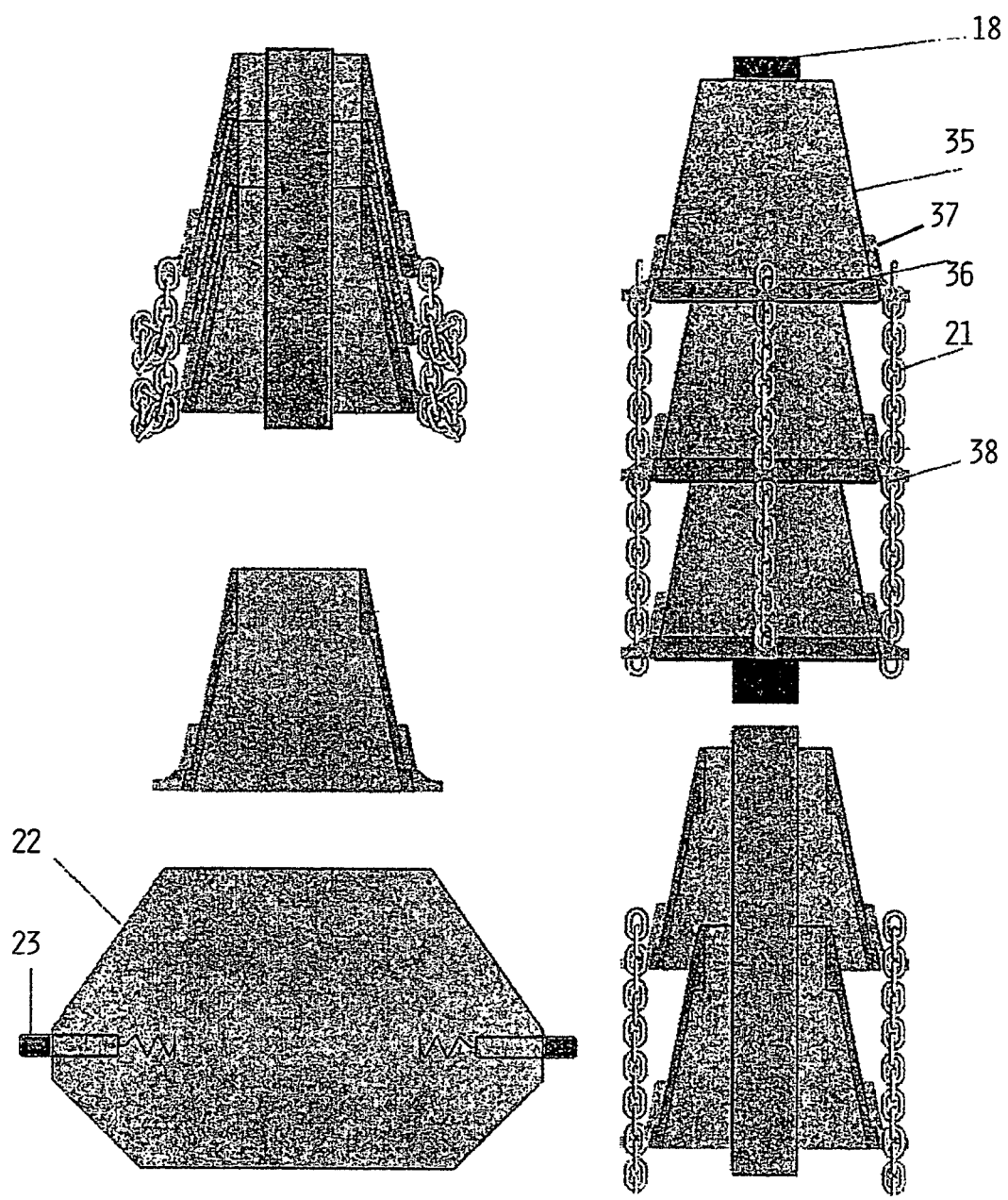
FIG. 4 shows details of the riser protection means.

FIG. 4 shows the parts of the riser protection means 20. As shown on the figure the protection means comprises a plurality of hollow, truncated, conical elements 35. Each element is open ended at both ends. The elements 35 are suspended to each other by means of chains or wires 21. The riser extends through the set of elements 35.

Such riser protection means 20 will resist dragging and impact loads from ice passing under the keel of the vessel. The design of the elements 35 in the riser protection means 20, (ref. FIGS. 3 and 4) will give the required bending capabilities due to suspended, separate elements, and will protect the riser from excessive bending.

Since the elements 35 are suspended from each other, the elements 35, when the riser protection means 29 is lowered, will be stacked into each other. This allows the riser protection means 20 always to have an adequate length. When the vessel is in its mean position, some elements 35 are stacked at the bottom of the riser protection means 20, on top of the silo 24. Consequently, the total length of the riser protection means 20 will be sufficiently long to follow the heave of the vessel 10.

The elements 35 are suspended independently of the riser 18. The riser 18 will thus heave with the vessel 10 and is free to slide within the lower elements 35.

A possible design for the elements 35 is presented in FIG. 4. This design may be varied without deviating from the inventive idea and only shown to give an idea of the function of the elements 35. On the drawing, chains 21 are used to link the elements 35. It should be appreciated however, that wires or other type of links may be used. The drawing suggests further that four chains 21 are used to link the elements 35. It should be appreciated that the number of chains may be varied, as for example three chains may be suitable.

As further shown in FIG. 4 the lower rim 36 of each element 35 may be provided with a stacking ridge 37 which also includes attachment eyes 38 for the chains 21.

Further, FIG. 4 shows a schematic view of the riser socket 22. As shown in the Figure the riser socket 22 is provided with locking means 39 intended to interact with corresponding recesses in the top slab 25, thereby interlocking the top slab 25 and the riser socket 22 when in operational mode.

FIG. 5 shows the riser protection means 20 in a retracted position, the riser protection means 20 being in an in-active position within the cell 26 in the silo 24. Here the submerged turret buoy 19 is resting on the top slab 25, while the riser socket 22 is released from its engagement with the top slab 25, resting on a particularly adapted support 40 at the lower end of the cell 26. In this position the elements 35 are stacked on top of each other, while substantially the entire length of the riser 18 is reeled on the reel 28 in the chamber 27. As further shown on FIG. 5 the sag bend of the riser 28 extends below the lower end of the slot 33. The mooring lines 17 rest freely on the sea bed 16.

Figure 6:
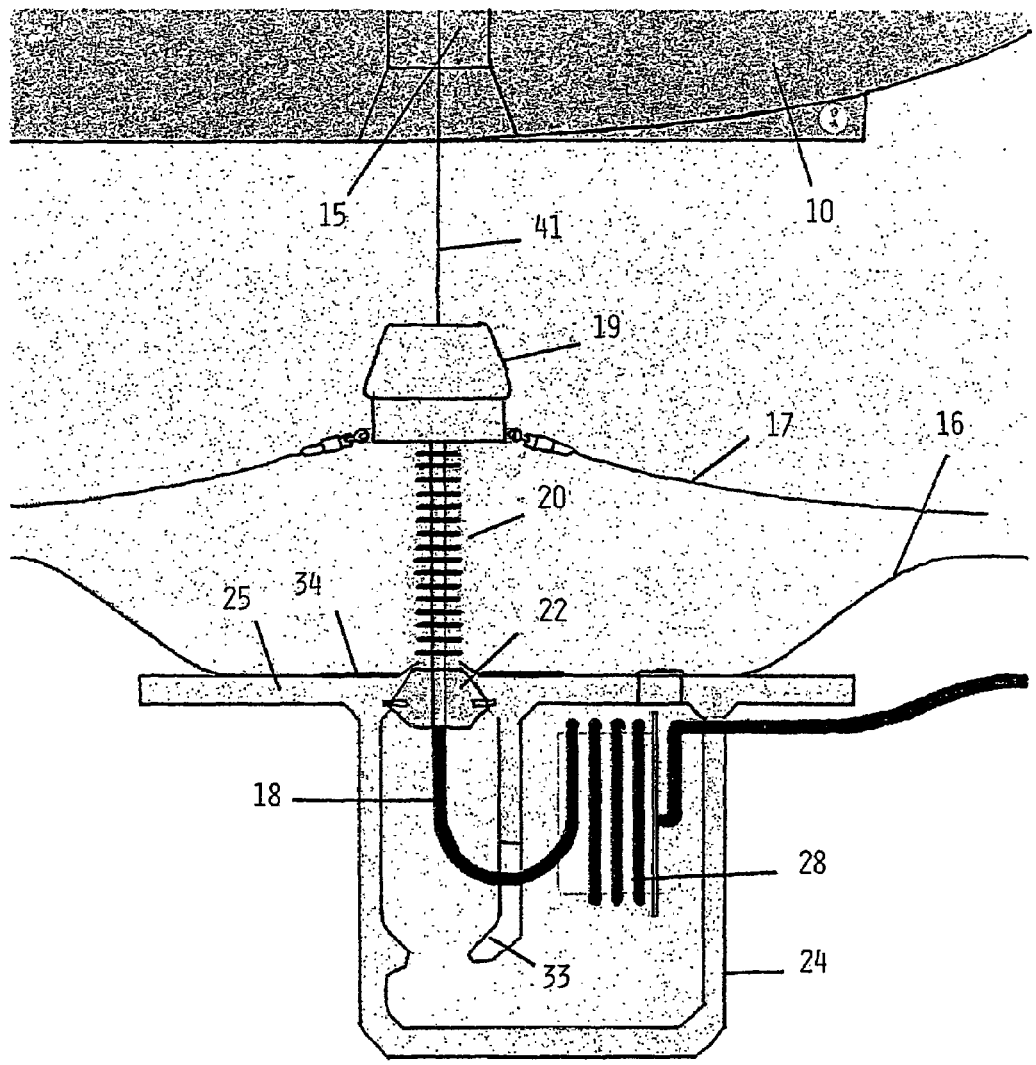
FIG. 6 shows the riser protection in the process of being lifted up from its retracted position towards the vessel.

FIG. 6 shows the loading system in the process of being lifted up towards the vessel 10 by means of a wire 41. As shown, the submerged turret buoy 19 is lifted off the top slab 25 and the riser socket 22 is in a locked position in the top slab 25. The riser 18 is fed out from the riser reel 28 as the submerged turret buoy 19 is lifted upwards.

Figure 7:
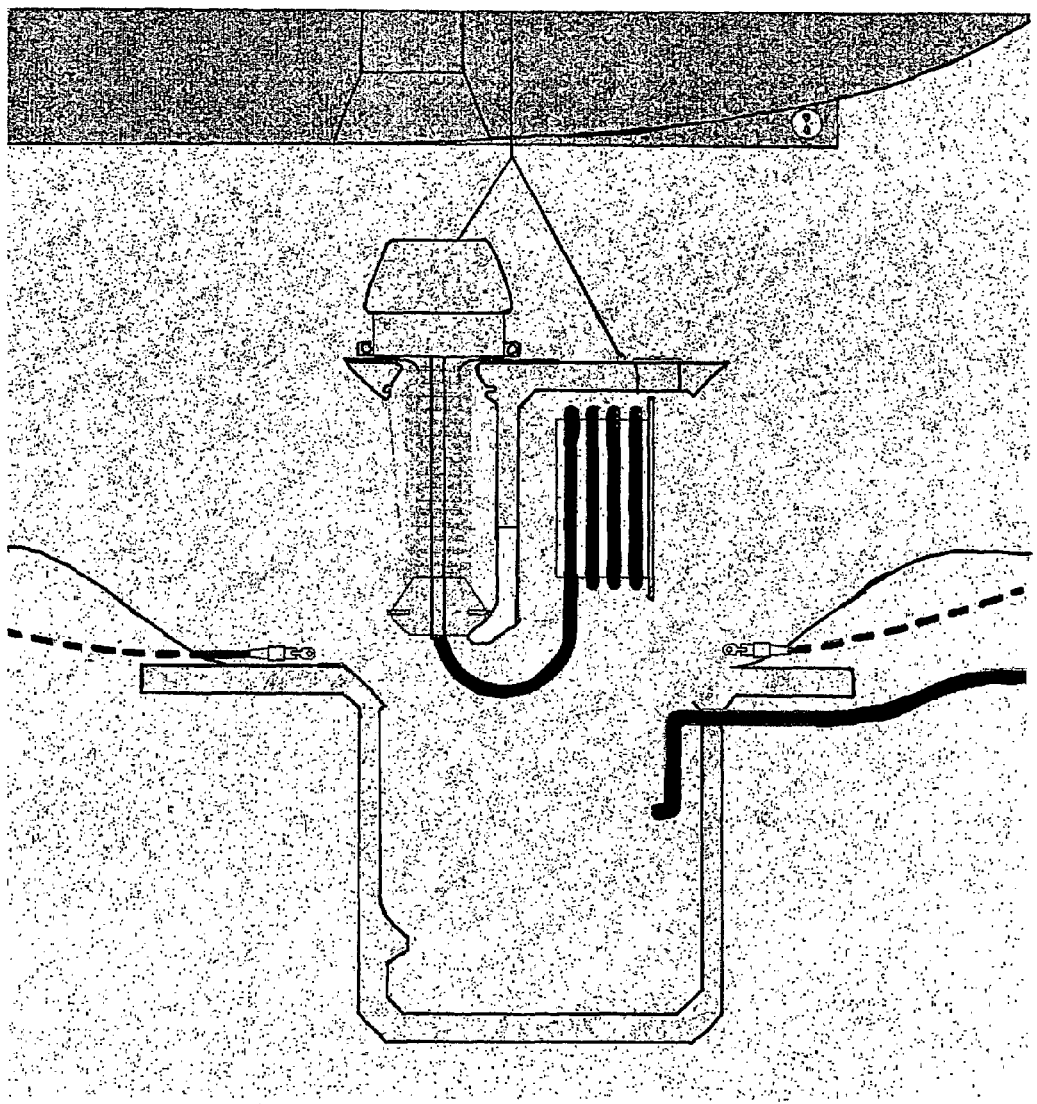
FIG. 7 shows one step in the process of installing parts of the loading system on the sea bed.

FIG. 7 shows one stage in the installation process of the loading system according to the invention. Firstly, the silo 24 is installed on the sea bed 16. Alternatively, the silo 24 may be embedded into the sea bed 16 as shown in FIG. 7. Mooring lines 17 may be preinstalled, resting on the sea bed 16. A preferably prefabricated unit comprising the top slab 25 for the silo 24, the reel 28 with the riser 18 and the riser protection means 20, including the submerged turret buoy is lowered down onto the silo 24 and secured to silo 24. Thereafter the swivel link at the lower end of the riser 18 is connected to the pipe line 29. Further, the mooring lines 17 are attached to the submerged turret buoy 19.

The system operates in the following way:

At first the elements 23 are stored in a stacked configuration in the cell 26 of the silo 24. The vessel 10 comes into position over the silo 24 and connects to the system, ref. the situation shown in FIG. 5. It first lifts the buoy and the riser socket 22 off its lower support 40 and then lifts out the whole riser protection means 20 to a position as shown in FIG. 6. The riser socket 22 (details shown in FIG. 4) is then fastened to the top slab 25 of the silo 24, engaging the locking means 39 on the riser socket 22 with corresponding means on the top slab 25. During this first lifting operation, the reel 28 is not rotated; the slack in the riser being sufficient to provide the required length. The vessel 10 then pulls the submerged turret buoy 19 upwardly into contact and locked engagement with the moon pool 15 on the vessel 10 (FIG. 3). During this phase, the riser 18 is unreeled to a position where the slack in the riser 18 is sufficient to compensate for the heave of the vessel 10. For this purpose a vertical slot 33 is provided in wall of the cell 26, adjacent the reel 28, allowing the riser 18 to move up and down. In FIG. 3 two extreme positions of the riser 18 are shown by dotted lines. When the system is connected to the vessel 10, the reel 28 is not intended to rotate, and consequently does not have to feed out or pull in the riser 18 to follow dynamically the motions of the vessel 10.

For the disconnection phase, the operations are the same in a reverse manner. The system can be designed as "self storable". In case of an emergency disconnection, the whole system may retract automatically into the silo.

For installation and for heavy maintenance, the top slab 25 may be unlocked from the silo and lifted up onboard a barge, vessel or the like.

An important advantage of this system is its ability to operate in any ice condition. As long as the vessel 10 and the mooring can withstand the incoming sea ice, so will the riser 18, as it is at least partly protected under the vessel 10. The vertical elasticity of the system makes it able to cope with quite heavy seas. This loading system will thus have a very high operability rate.

This transfer system is independent of the methods used for connection to the vessel 10. It is very suitable for the STL system for example, but may also be employed in other systems. It could for example be adapted to be used as a Single Anchor Mooring loading system for light ice infested waters or waters where, for example, use of heavy trawl boards is taking place.

The loading system according to the invention may be installed in different water depths, from very shallow waters (such as for example 20 m or less as met offshore Sakhalin in the Pechora Sea and the Northern Caspian Sea) to deeper water. For deeper waters, the riser protection means 20 does not need to cover the riser 18 along its entire length, only the upper part which may be subjected to ice loads. Limiting the riser protection means 20 to cover only the upper part of the riser 18 will allow the system still to be compact when stored on the sea bed 16.

The invention claimed is:

1. A protective system for protection of a loading system for transfer of hydrocarbons between an installation on the sea bed and a floating vessel in areas exposed to drifting ice, comprising:

a submerged turret loading arrangement including a submerged loading/unloading buoy configured for introduction and releasable securement in a downwardly open receiving space in the vessel, a flexible riser extending from the sea bed installation to the buoy, and configured to be securely connected to a corresponding pipe on board the vessel, and a plurality of mooring lines connected to the buoy and extending outwards therefrom, the buoy and the mooring lines serving as an anchoring system allowing the vessel to weathervane, wherein the protective system further comprises:

a flexible riser protection configured to protect the riser from impacts by yielding to the force imposed by the ice when the riser is in an extended, load transferring mode, the upper end of the riser protection being attached to the loading/unloading buoy and the riser protection surrounding the riser, and a protective structure of the installation located in or on the sea bed for protection of the riser when in a retracted position in a non-operative mode, wherein the protective structure contains means for storing the riser in a protected position when disconnected and retracted from the vessel.

2. The protective system according to claim 1, wherein the riser is protected at least along a portion of its length, the riser protection being suspended from the submerged turret buoy by means of a plurality of chains or wires.

3. The protective system according to claim 2, wherein the riser protection is formed by a plurality of separate, truncated conical elements, each being suspended from the chains or wires.

4. The protective system according to claim 3, wherein the conical elements have a smaller upper diameter and a larger lower diameter or vice versa.

5. The protective system according to claim 1, wherein the protective structure is equipped with a top portion being substantially flush with the adjacent sea bed, the top portion being provided with an opening communicating with the interior of the protective structure.

6. The protective system according to claim 5, wherein the protective structure is provided with a vertical, downwardly open cell located directly below the opening in the top portion.

7. The protective system according to claim 6, wherein a slot is provided in a cell wall of the cell adjacent the reel.

8. The protective system according to claim 7, wherein the slot has a height that is larger than a maximum expected vertical heave amplitude of the vessel and a width of the slot is larger than a diameter of the riser.

9. The protective system according to claim 5, wherein the opening at the top portion of the protective structure is provided with a flexible deflector, preventing soil from dropping down into the protective structure through the opening.

10. The protective system according to claim 1, wherein the riser may be completely retracted into the protective structure when idle, the riser being stored on a reel arranged inside the protective structure.

11. The protective system according to claim 10, wherein the reel rotates around a horizontal axis, the riser being connected to a supply line for hydrocarbons by means of a swivel, allowing the reel to rotate relative to the supply line.

12. The protective system according to claim 1, wherein the riser protection may be completely retracted into a cell of the protective structure when the riser is not in use.

13. The protective system according to claim 12, wherein the riser protection comprises riser protection elements, the riser protection elements being stacked on top of each other in a retracted position inside the cell.

14. The protective system according to claim 1, wherein the riser protection, at its lower end, is equipped with a socket, configured to interact with a retaining means on the protective structure.

15. The protective system according to claim 14, wherein the lower ends of the supporting chains are attached to the socket.

16. The protective system according to claim 14, wherein the socket is equipped with locking means for securing the socket in a locked position with respect to the retaining means on the protective structure.

17. The protective system according to claim 16, wherein the riser protection comprises riser protection elements, the locking means are releasably arranged, enabling the socket to be lowered down into the lower part of the protective structure to a retracted position together with the protection elements in a stacked arrangement when the riser is idle.

18. The protective system according to claim 14, wherein a lower part of a cell wall of a cell of the protective structure is provided with a retaining means to support the socket when in a retracted position within the protective structure.

19. The protective system according to claim 14, wherein the socket has an upwardly protruding, conical shape configured to interact with a corresponding opening in a top slab of the protective structure, thereby preventing the socket from moving upwards.

20. A method for protecting a loading system for transfer of hydrocarbons when mooring a vessel to a submerged turret buoy, comprising:
bringing a vessel into position above a submerged riser, the upper end of which is provided with the submerged turret buoy,
pulling the riser with the turret buoy upwards into engagement with corresponding means on the vessel, and
further lifting a flexible riser protection encompassing the riser upwards, the riser protection protecting at least an upper portion of the riser by yielding to the force imposed by ice when in a retracted position, the upper end of the riser protection being attached to the buoy and the riser protection surrounding the riser.

21. The method according to claim 20, wherein the riser is reeled out from a stored position on a reel on the sea bed.

22. The method according to claim 21, wherein the riser protection is raised towards the vessel from a retracted position on the sea bed to an extended position in the same operation as for lifting the riser.

23. The method according to claim 21, wherein the riser is reeled out from a reel located in a protective structure in the sea bed.

24. The method according to claim 23, wherein the riser is reeled out to such extent that a sagging bend is provided at the lower end of the riser, compensating at any time for possible heave caused by the vessel.

25. The method according to claim 20, wherein the riser and the riser protection may be completely retracted to an inactive position on a sea bed.

26. The method according to claim 20, wherein the riser and the riser protection are stored in a retracted position on a sea bed, a socket forming the lower end of the riser protection resting on a support inside a protective structure on the sea bed.

27. The method according to claim 26, wherein the riser, the socket and the riser protection and the submerged turret buoy are lifted upwards until the socket engages with an engagement means in a top slab of the protective structure, whereafter the riser and the submerged turret buoy are lifted further upwards towards the vessel subsequently lifting the riser protection from a stacked position to an extended position.

28. The method according to claim 20, wherein the riser protection comprises a plurality of truncated, conical cylinders suspended from each other by means of chains or lines, the method further comprising stacking conical cylinders on top of each other during the retraction process.

29. A method for installing a riser protection system on a sea bed, comprising:
establishing a protective structure in the sea bed to protect a portion of the riser when in a retracted position, and
lowering a separate, prefabricated unit comprising a reel, a riser reeled on to the reel, and a top configured to form a top of the protective structure, down into the protective structure and connecting an end of the reeled riser to a supply line for hydrocarbons, the connection being achieved by means of a swivel, and
wherein an upper end of the riser is provided with a loading/unloading buoy.

* * * * *